United States Patent [19]

Minakuchi

[11] 4,184,114
[45] Jan. 15, 1980

[54] ARRANGEMENT FOR INDICATING REVOLUTIONAL SPEED OF A REVOLVING BODY

[75] Inventor: Hiroshi Minakuchi, Kadoma, Japan

[73] Assignee: Matsushita Electric Industrial Co., Ltd., Japan

[21] Appl. No.: 863,957

[22] Filed: Dec. 23, 1977

[30] Foreign Application Priority Data

Dec. 24, 1976 [JP] Japan .............................. 51-156895

[51] Int. Cl.² .......................... G01P 3/48; G01R 23/14
[52] U.S. Cl. .................................... 324/161; 324/79D
[58] Field of Search ............ 324/161, 166, 160, 78 Z, 324/79 D, 79 R, 158 MG

[56] References Cited

U.S. PATENT DOCUMENTS 4,041,832  8/1977  Risch ................................ 324/79 R

OTHER PUBLICATIONS

Hellar, Jr.; "Precision Speed Measurement...";General Electric Review; Oct. 1949; pp. 22-24, 26.

Zimmerman, R. H.; "Measuring Frequency Deviation"; Electronic Industries; Jun. 1965; pp. 100, 101, 107.

Clapp, C; "Beat Frequency Indicator..."; Electronic Engineering; Feb. 1977; p. 19.

Primary Examiner—Rudolph V. Rolinec
Assistant Examiner—Ernest F. Karlsen
Attorney, Agent, or Firm—Lowe, King, Price & Becker

[57] ABSTRACT

A revolution speed indicator arrangement is provided which includes a reference frequency oscillator, a tachogenerator for generating a frequency associated with a revolutional speed of the revolving body, difference frequency deriving circuitry interconnected to the reference frequency oscillator and the tachogenerator for deriving a difference frequency between the frequency associated with the revolutional speed and the reference frequency, and an indicator unit responsive to the difference frequency deriving circuitry for visually indicating the difference frequency. The arrangement may be provided with a coincidence determining unit responsive to the difference frequency for detecting coincidence between the frequency associated with the revolutional speed and the reference frequency, and the indicator unit is connected to the coincidence detecting unit to visually indicate the coincidence.

5 Claims, 16 Drawing Figures

ARRANGEMENT FOR INDICATING REVOLUTIONAL SPEED OF A REVOLVING BODY

BACKGROUND OF THE INVENTION

1. Field of the Invention

The present invention relates generally to an arrangement for indicating revolutional speed of a revolving body, and more particularly, to a revolutional speed indicator arrangement for use in record players for visually indicating whether or not revolutional speed of a turntable differs from a reference speed.

2. Description of the Prior Art

In order to determine how revolutional speed of a revolving body differs from a difference speed, the stroboscopic method has been utilized in the prior art. In the conventional stroboscopic method, a record player turntable, for example, is provided with a stroboscopic pattern of stripes along the circumference thereof, which pattern is illuminated by a neon tube flashing at a predetermined frequency. When the turntable rotates at a rotating speed equal to a reference speed, such as 33⅓ rpm, the stroboscopic pattern appears as if it were still. If the turntable runs faster than the reference speed, then one can visually recognize that the pattern is running in the revolutionary direction of the turntable. On the other hand, if the revolutionary speed of the turntable becomes lower than the reference speed, then the observer will see the stroboscopic pattern running in the reverse direction to the revolution of the turntable.

The speed at which the stroboscopic pattern appears to run as the turntable rotates is associated with a difference between the revolutional speed of the turntable and the reference speed. If such a difference is significantly large, the appearance of the pattern of stripes under the storoboscopic light can easily be recognized at a glance. However, when the difference between the revolutional speed of the turntable and the reference speed is sufficiently small, it is very difficult for the observer to determine whether or not the difference exists. In addition, the provision of such stroboscopic patterns of stripes in the circumference of turntables is undesirable from industrial design standpoint.

SUMMARY OF THE INVENTION

It is an object of the present invention to provide a revolutional speed indicator arrangement by which one can easily recognize a visual indication representing how revolutional speed of a revolving body differs from a reference speed.

It is another object of the present invention to provide a revolutional speed indicator arrangement to give a pleasing appearance for turntables for use in record players.

It is still another object of the present invention to provide a revolutional speed indicator arrangement which is digitalized for motor speed control purposes.

It is further object of the present invention to provide a revolutional speed indicator arrangement which is capable of clearly indicating a coincidence of a rotational speed of a rotating body with a reference speed.

It is still further object of the present invention to provide a revolutional speed indicator arrangement which clearly indicates how and what direction a rotational speed of a rotating body deviates from a reference speed.

It is a further object of the invention to provide a revolutional speed indicator arrangement which can easily lend itself to integrated circuits production.

The foregoing problems are solved by a revolutional speed indicator arrangement, in accordance with the present invention, which includes means for generating a reference frequency, revolutional speed sensing means for producing a frequency associated with a revolutional speed of a revolving body, means connected to the reference frequency generating means and the revolutional speed sensing means for deriving a difference frequency between the frequency associated with the revolutional speed and the reference frequency, and indicator means connected to the difference frequency deriving means for visually indicating the difference frequency.

In accordance with an aspect of the present invention, the indicator means includes indicator elements devices which flash at intervals associated with a frequency difference between a signal representative of rotational speed of a rotating body and a signal representative of a reference speed.

In accordance with another aspect of the present invention, the indicator elements are continuously lighted when a revolving body runs at a speed equal to a reference speed.

In accordance with still another aspect of the present invention, the revolutional speed indicator arrangement includes an indicator element flashing when a revolutional speed of a revolving body exceeds a reference speed, and another distinct indicator element flashing when a revolutional speed of the body decreases with respect to the reference speed.

BRIEF DESCRIPTION OF THE DRAWING

The objects and features of the present invention will become more apparent from a consideration of the following detailed description and the drawing in which.

DESCRIPTION OF THE PREFERRED EMBODIMENT

Figure 1:
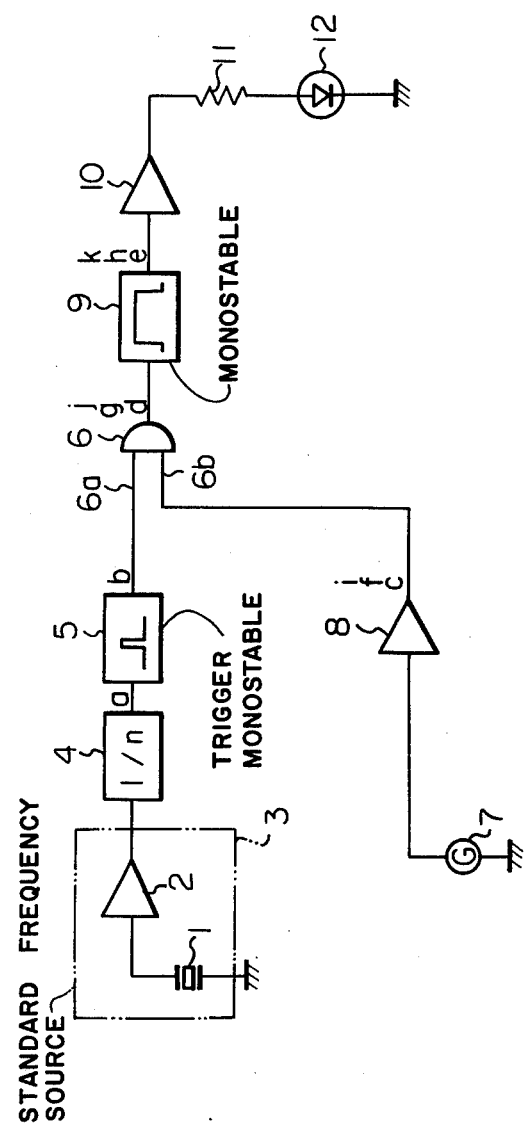
FIG. 1 is a schematic block diagram of a first embodiment of the revolutional speed indicator arrangement in accordance with the present invention.

The preferred embodiments of the present invention will be detailed with particular reference to the accompanying drawing, in which like reference numerals designate the same constituent components of the illustrative embodiments.

FIG. 1 is a schematic block diagram showing a preferred embodiment of the revolutional speed indicator arrangement in accordance with the present invention. In the figure, a crystal oscillator 3 includes a quartz vibrator 1 and an amplifier 2. One plate of quartz vibrator 1 is grounded and the remaining plate thereof is coupled to an input of amplifier 2, of which the output is connected to a frequency divider 4, which develops a signal at frequency 1/n, where n is the frequency of the signal generated by amplifier 2. The signal at frequency a from the frequency divider 4 is coupled to a monostable multivibrator 5, of which the output b is applied to one of the input ports 6a of a two-input AND gate 6.

The indicator arrangement includes a frequency generator, or tachogenerator 7, which is mechanically coupled to a revolutional body, not shown, and generates a signal having a frequency associated with the revolutional speed of the body. One of the output terminals of generator 7 is grounded and the remaining terminal thereof is connected to an input port of another amplifier 8, whose output port is connected to the other input port 6b of the two-input AND gate 6. An output port of AND gate 6 is coupled to an input port of another monostable multivibrator 9, from which an output signal is applied to another amplifier 10. An output port of amplifier 10 is connected to the anode of a light emitting diode 12 through a current limiting resistor 11. The cathode of light emitting diode 12 is grounded as shown in the figure. It is to be noted that the schematic blocks, such as amplifier 2, crystal oscillator 3, frequency divider 4, monostable multivibrator 5, AND gate 6, frequency generator 7, amplifier 8, monostable multivibrator 9, and amplifier 10, shown in FIG. 1, are conventional, and therefore a detailed explanation thereof is omitted.

Figure 2:
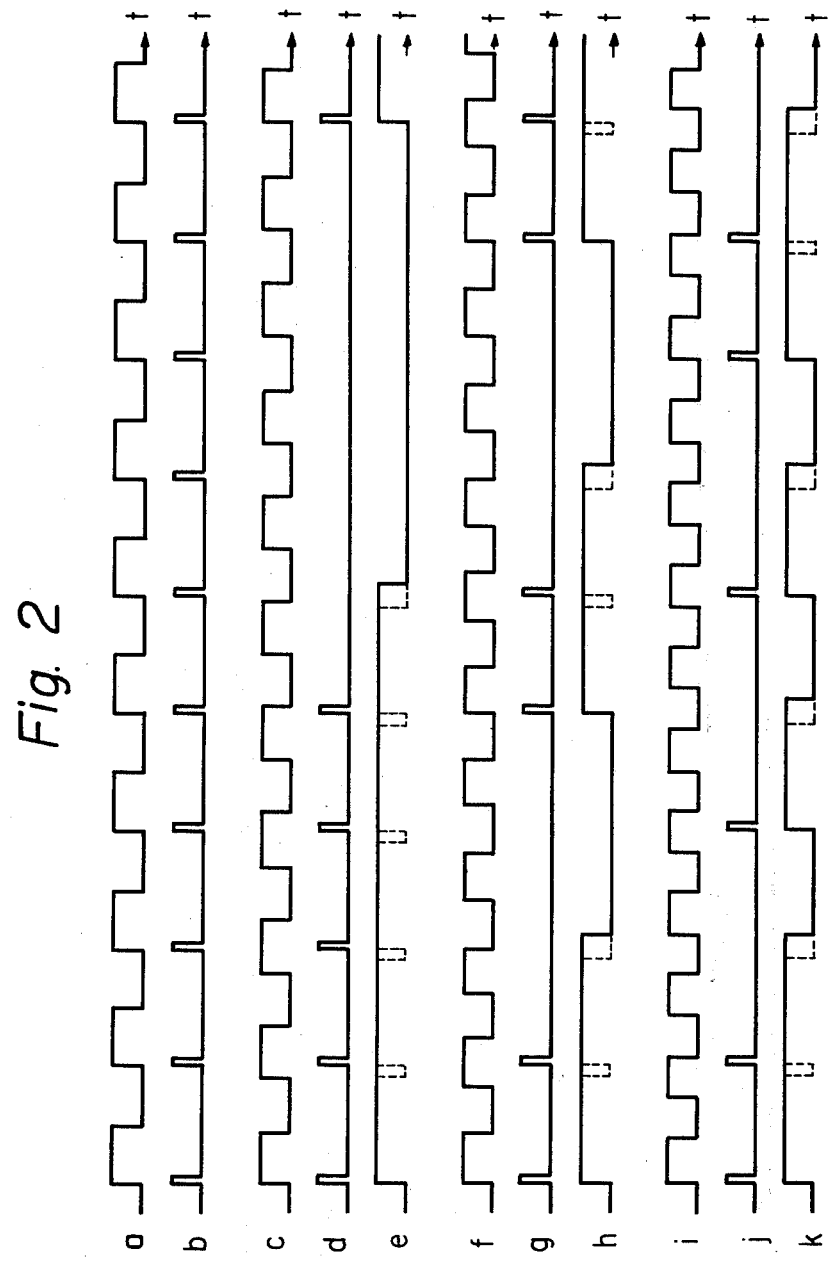
FIGS. 2, 3 and 4 show the signal waveforms useful in understanding the operation of the first illustrative embodiment shown in FIG. 1.

In the operation of the revolutional speed indicator arrangement illustrated in FIG. 1, the output frequency generated from crystal oscillator 3 is divided in frequency divider 4 so as to be equal in frequency to the signal which is provided from frequency generator 7 while the revolving body (not shown) stays in a constant revolution. FIG. 2a shows the output signal waveform of the frequency divider 4 in this situation.

The monostable multivibrator 5 is adapted to stay in its unstable condition during a period of time which is sufficiently shorter than the period of the output signal from the frequency divider 4. Therefore, the signal waveform developed from multivibrator 5 will be positive pulses having a short duration, as shown in FIG. 2b.

Those positive pulses may be assumed as a train of positively differentiated pulses because only the positive-going edges of the pulses from frequency divider 4 have been differentiated through monostable multivibrator 5.

Assuming now that the revolutional speed of the revolving body (not shown) becomes slightly higher than the reference revolution speed, FIG. 2C shows the output signal waveform from the amplifier 8 in that situation. The signal waveform shown in FIG. 2c is applied to the input port 6b of AND gate 6. During the intervals while both the signal applied to the other input port 6a of AND gate 6, FIG. 2b, and the signal appearing on the lead 6b, FIG. 2c, become HIGH, AND gate 6 is activated to develop a HIGH level signal, as is shown in FIG. 2d.

In the illustrative embodiment of the present invention, the monostable multivibrator 9 is a retriggerable monostable multivibrator, and adjusted in such a manner that a period of time during which multivibrator 9 stays in its unstable condition is a little bit longer than the repetitive period of time of the signal waveform produced from frequency divider 4, FIG. 2a. When the monostable multivibrator 9 receives the first pulse from AND gate 6, it is triggered to its unstable state. Multivibrator 9, when receiving the second pulse from gate 6 prior to return to its stable state, still remains in its unstable condition. That is, in response to the second pulse received the time interval during which multivibrator 9 stays in its unstable state is timed so that a new time interval begins. As can be seen from FIG. 2e, in the illustrative embodiment the output from monostable multivibrator 9 has been kept HIGH since the reception of the first trigger pulse, FIG. 2d, and returns to its LOW state when the enable or operative time interval thereof is finished after the reception of the fifth pulse. This is because, during the last enable interval, multivibrator 9 receives no trigger pulse following the fifth pulse from AND gate 6 in this situation. Consequently, in response to the signal waveform shown in FIG. 2d multivibrator 9 produces the output signal waveform as shown in the solid line in FIG. 2e.

It should be noted that if one employs an ordinary monostable multivibrator of the non-retriggering type the operative time interval of multivibrator 9 has to be set a little bit shorter than the repetitive period of time of the signal waveform, FIG. 2a, provided from frequency divider 4. In that situation the output signal waveform from the monostable multivibrator is plotted in the dotted line in FIG. 2e.

The signal waveform shown in FIG. 2e is in turn amplified by amplifier 10 and applied to light emitting diode 12 through current limitting resistor 11, thereby flashing light emitting diode 12 in response to changes in voltage level of the signal waveform shown in FIG. 2e.

When the rotating body becomes revolving faster than in the above situation, amplifier 8 will produce a signal waveform having a shorter repetitive period of time, as shown in FIG. 2f. As a result, AND gate 6 develops the output signal waveform shown in FIG. 2g in the manner similar to the operation described above. Multivibrator 9 is in turn triggered by the triggering pulse train shown in FIG. 2g to develop the output signal waveform shown in FIG. 2h. As can be seen from FIG. 2h, the duration and repetitive interval of the pulses h are shorter than those of the pulses shown in FIG. 2e, so that the light emitting diode 12 will flash in the shorter time intervals than before, i.e. FIG. 2e.

If the rotating body runs even faster, then the signal waveforms developed from amplifier 8, AND gate 6 and monostable multivibrator 9 are as shown in FIGS. 2i, 2j and 2k, respectively. The light emitting diode 12 will flash in the time intervals shorter than the previous situation.

Figure 3:
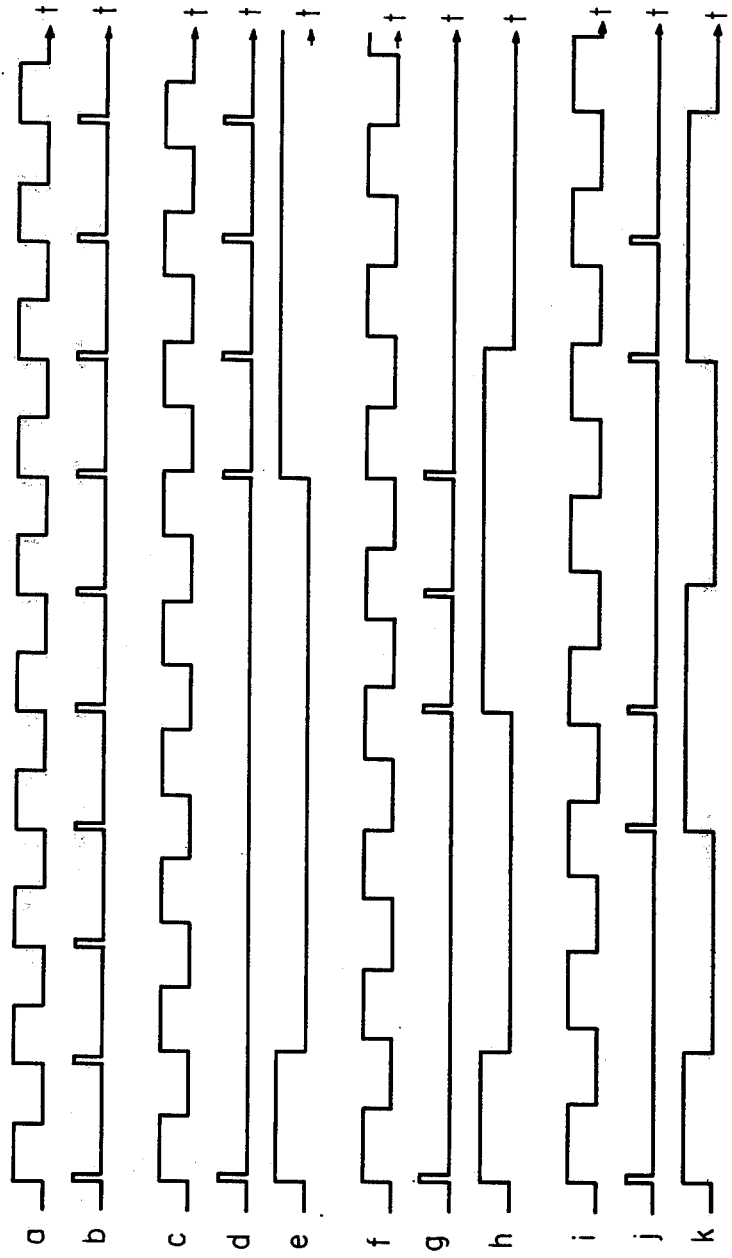

Now, consider that the revolving body runs a little bit slower than the reference revolutional speed. Then, amplifier 8 develops the signal waveform, FIG. 3c, of which the frequency is slightly lower than that of the reference signal, FIG. 3a. FIGS. 3d and 3e show the signal waveforms from AND gate 6 and monostable multivibrator 9, respectively. Since AND gate 6 is enabled only when both of the inputs thereof are in their HIGH level, the enabling period of time and the repetitive time interval of the output frequency become shorter if the input frequency on lead 6b is out of phase from the reference frequency supplied over lead 6a.

When the rotating speed of the revolving body becomes even lower, amplifier 8, AND gate 6 and monostable multivibrator 9 produce the signal waveforms shown in FIGS. 3f, 3g and 3h, respectively. If the revolving body now revolves still more slowly, then the signal waveforms illustrated in FIGS. 3i, 3j and 3k will be produced from amplifier 8, AND gate 6 and monostable multivibrator 9, respectively.

In summary, the revolutional speed indicator arrangement in accordance with the present invention shown in FIG. 1 operates in such a manner that the higher or lower the revolutional speed of the rotating body than the reference frequency, the more frequently light emitting diode 12 flashes. Since the flashing period of time of the light emitting diode 12 is thus associated with the difference in phase of the rotational speed signal from the reference frequency, one can easily recognize an extent of such a difference at a glance.

It is to be noted that if higher accuracy in the reference frequency is not required, the commercial a.c. line voltage source may be utilized rather than crystal oscillator 3, frequency divider 4 and monostable multivibrator 5. In such a case, frequencies of 50, 60, 100 or 120 Hz may be introduced into the system. Also, the light emitting diode 12 may be replaced by a filament or incandescent lamp and a liquid crystal indicator device. Of course, other solid vibrator elements, such as a ceramic oscillator, may be employed instead of the quartz vibrator 1.

If the revolutional speed control system (not shown) for the revolving body is equipped with a frequency generator or tachogenerator for sensing the revolving velocity and a crystal oscillator is provided as a reference to control revolutional speed, the revolutional speed indicator arrangement may not include frequency generator 7, crystal oscillator 3, frequency divider 4, monostable multivibrator 5 and amplifier 8, which are involved in the system illustrated in FIG. 1. For example, direct-drive record players of the type, which have been available commercially, include a crystal oscillator functioning as a reference frequency source and a frequency divider for dividing the frequency supplied from the crystal oscillator together with a change-over circuit for manually switching the playback speeds of 33⅓ rpm and 45 rpm and a tachogenerator for sensing the revolutional speed of the turntable. Those circuits are available for the rotation speed indicator system in accordance with the present invention. A differential circuit may take the place of the monostable multivibrator 5. A ring counter may be used as the frequency divider 4 and in that case the output signal from the ring counter is a differentiated waveform so that the differentiation circuit in monostable 5 may be removed.

Thus, in the arrangement for indicating revolutional speed of a revolving body depicted in FIG. 1, the light emitting diode 12 flashes when the revolving speed of the revolving body differs from the value of the reference revolutional speed, indicating that fact to the observer. However, if the rotational speed of the rotation body is equal to the predetermined reference speed, the light emitting diode does not always flash. That is, flashing is in dependence upon phase differences between the signal waveform produced from the frequency generator mechanically coupled to the rotation body and the reference frequency provided from the reference frequency oscillator circuit.

Figure 4:
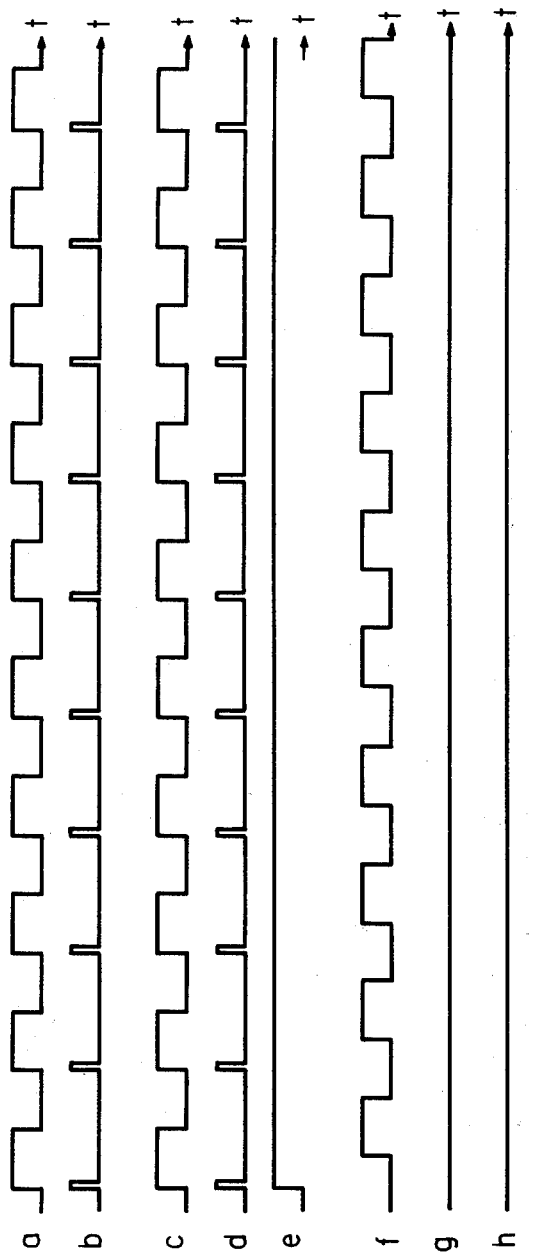

That situation will be explained with reference to FIG. 4. When the output signal derived from the frequency divider 4 (FIG. 4a) is equal to the output signal developed from the amplifier 8 in phase, AND gate 6 develops subsequent pulses with constant time intervals as shown in FIG. 4d to enable the one-shot multivibrator 9 to produce a continuous HIGH level signal, keeping light emitting diode 12 turned ON continuously.

On the other hand, if the signal waveform produced from amplifier 8 shown in FIG. 4f is out of phase approximately by $\pi/2$ with respect to the reference frequency, FIG. 4a, the AND gate 6 is never enabled to develop the HIGH level output signal as shown in FIG. 4g. Then, monostable multivibrator 9 is not triggered at all so that the output therefrom is maintained LOW, as shown in FIG. 4h.

The illustrative embodiment in FIG. 1 thus involves the disadvantage that light emitting diode 12 sometimes fails to flash in dependence upon the phase difference between the frequencies developed from tachogenerator 7 and reference oscillator 3 even if both frequencies become equal to each other.

Figure 5:
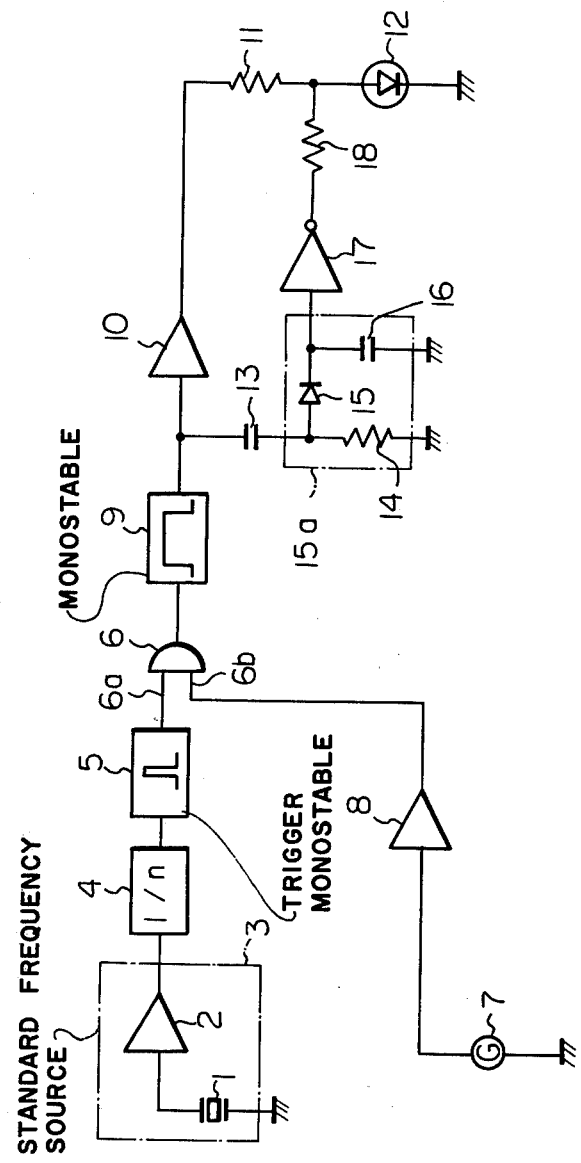
FIG. 5 is a schematic circuit block diagram illustrating a second embodiment of the revolutional speed indicator arrangement in accordance with the present invention.

FIG. 5 depicts a second embodiment of the revolutional speed indicator arrangement in accordance with the present invention, in which the above drawback has been eliminated. In the figure, the output port of the one-shot multivibrator 9 is also coupled through a capacitor 13 to a rectifier circuit 15a which includes resistor 14, a diode 15 and a capacitor 16. The output from the rectifier circuit 15a is connected to the input port of an inverter amplifier 17, which provides light emitting diode 12 with its output through a resistor 18. Other components in FIG. 5 which are designated by the corresponding reference numerals are substantially identical with the corresponding elements illustrated in FIG. 1, therefore omitting a detailed explanation on them.

In the illustrative arrangement in FIG. 5, the output from one-shot multivibrator 9 will not change when the signal provided from tachogenerator 7 mechanically coupled to the rotating body is equal to in frequency but different in phase from the reference oscillating signal. This utilizes the fact that in that instance the output from monostable multivibrator 9 involves no a.c. components therein. Since capacitor 16 is not charged up with the monostable multivibrator output which does not include any changes, inverting amplifier 17 illuminates light emitting diode 12 via resistor 18. If the revolution signal from amplifier 8 is almost in phase with the reference frequency, the diode 12 is also supplied with power from amplifier 10, increasing the brightness thereof.

When any difference in frequency appears between the reference oscillating signal and the revolution signal from amplifier 8, an a.c. component is involved in the output from one-shot multivibrator 9 and passes through capacitor 13 and diode 15 to be rectified to a d.c. current, which charges capacitor 16. Then, the output of inverter amplifier 17 is maintained LOW by the HIGH level signal on capacitor 16, so that light emitting diode 12 will repeatedly flash only in response to the waveform produced from amplifier 10.

The revolutional speed indicator arrangement shown in FIG. 5 includes the rectifier circuit composed of the diode 15 and the capacitors 13 and 16 to detect a coincidence of the revolution frequency with the reference frequency. Digital circuits, however such as monostable circuits, may be used to remove those capacitors, which are not as easily fabricated in integrated circuits as monostable circuits are.

It should be noted that the FIG. 5 indicator arrangement, which is adapted to keep the light emitting diode enabled continuously upon coincidence of the rotation frequency with the reference frequency, may be designed such that the light emitting diode 12 is disabled upon such coincidence. In other words, the indicator arrangement may be adapted to inhibit the light emitting diode from flashing while both of those frequencies are equal.

In the system, shown in FIG. 5, for indicating rotational speed of a rotating body in accordance with the present invention, the light emitting diode 12 is maintained enabled during coincidence between the output frequency from tachogenerator 7 mechanically coupled to the revolving body and the reference frequency generated from oscillator 3, and flashes when any difference occurs between both frequencies. The larger the difference, the shorter the flashing intervals. Namely, the light emitting diode flashes in a repetition period of time which is associated with the difference between both frequencies. Thus, when the output frequency supplied from tachogenerator 7 becomes higher or lower than the reference frequency, i.e. when the revolutional speed of the revolving body becomes faster or slower than the reference speed, light emitting diode 12 will flash in the same manner. Thus, the FIG. 5 system involves the problem that it cannot be determined from observation to the system whether the rotational speed of the rotating body is in fact higher or lower than the predetermined reference speed.

Figure 6:
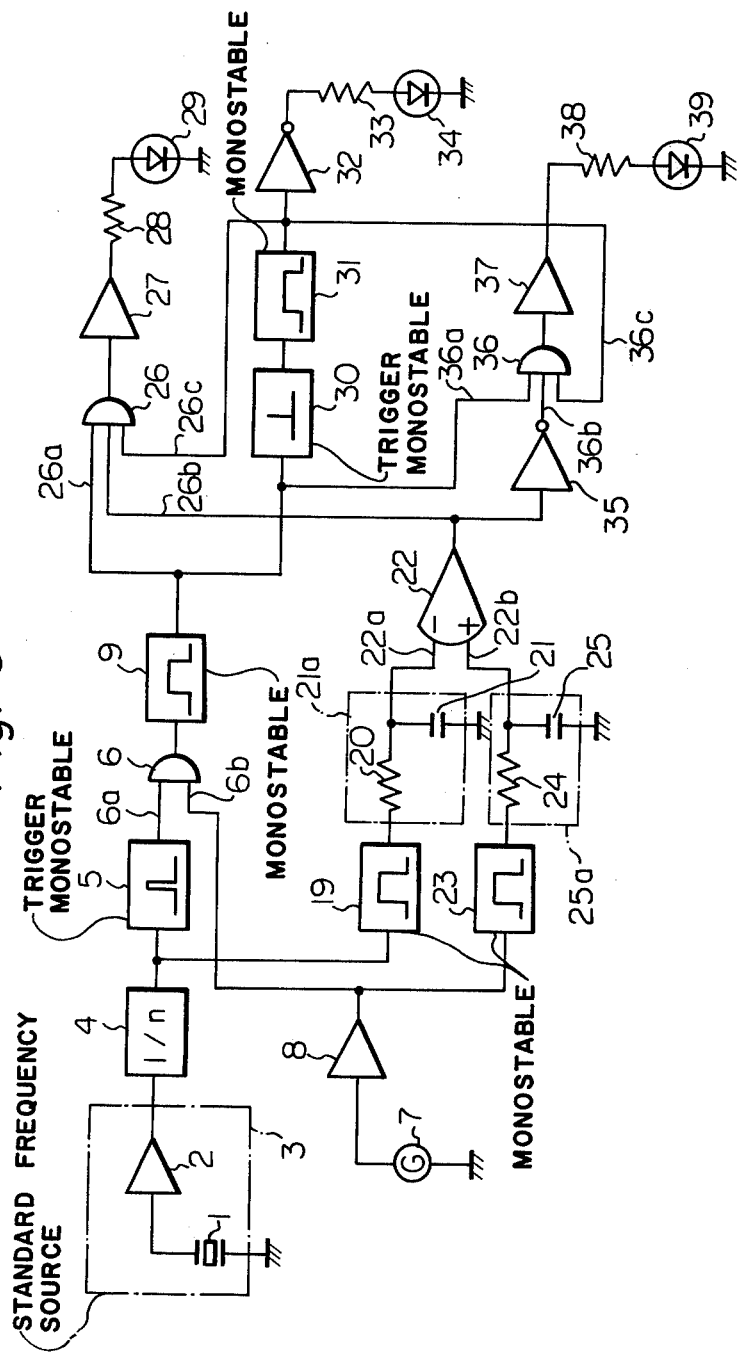
FIG. 6 shows in a schematic block diagram a third embodiment of the revolutional speed indicator arrangement in accordance with the present invention.

A third embodiment of the arrangement for indicating revolutional speed of a revolving body in accordance with the present invention is depicted in a schematic block diagram in FIG. 6, in which the illustrated arrangement is directed to a solution to the above problem. In the figure, a monostable multivibrator 19, which has an input connected to the output of the frequency divider 4, produces a timed output, that is directed to an inverting input port 22a of a comparator amplifier 22 by way of an integrator circuit 21a composed of a resistor 20 and a capacitor 21. The amplifier 8 has its output interconnected also to an input port of another monostable multivibrator 23, which has the same unstable period of time as monostable multivibrator 19. Monostable multivibrator 23 has an output coupled to a non-inverting input port 22b of comparator amplifier 22 via another integrator circuit 25a which comprises a resistor 24 having the same resistance as resistor 20 and a capacitor 25 having the same capacitance as capacitor 21.

One-shot multivibrator 9 has its output port interconnected to a first input port 26a of a three-input AND gate 26, which has a second input port 26b coupled to an output of comparator amplifier 22. An output of three-input AND gate 26 is applied to an amplifier 27, which has an output connected to a light emitting diode 29 through a resistor 28.

One-shot multivibrator 9 has its output port also interconnected to another monostable multivibrator 31, which has a sufficiently long operative period of time, by way of a trigger pulse generator circuit 30, which produces trigger pulses in response to negative-going edges of input pulses thereto. Monostable multivibrator 31 has an output coupled to an inverter amplifier 32, which has an output connected through a resistor 33 to another light emitting diode 34.

The monostable multivibrator 9 has its output interconnected also to a first input terminal 36a of another three-input AND gate 36, which has a second input terminal 36b coupled via an inverter amplifier 35 to the output of the comparator amplifier 22. The output of three-input AND gate 36 is applied to an amplifier 37, which has an output interconnected through a resistor 38 to a third light emitting diode 39. A third input terminal 26c of the three-input AND gate 26 and a third input terminal 36c of the AND gate 36 are in common interconnected to the output port of the monostable multivibrator 31.

In the elements shown in the schematic blocks in FIG. 6, monostable multivibrators 19 and 23, comparator amplifier 22 and inverter amplifier 35 are of well-known structure to those skilled in the art, and therefore detailed explanations thereabout are not described. The trigger pulse generator 30 will, however, be detailed hereinafter on its specific circuit configuration, FIG. 7, and the operation thereof with reference to the signal waveforms, FIG. 8, appearing at the respective points of the specific circuit, in order to be useful in understanding the following descriptions on the embodiment illustrated.

Figure 7:
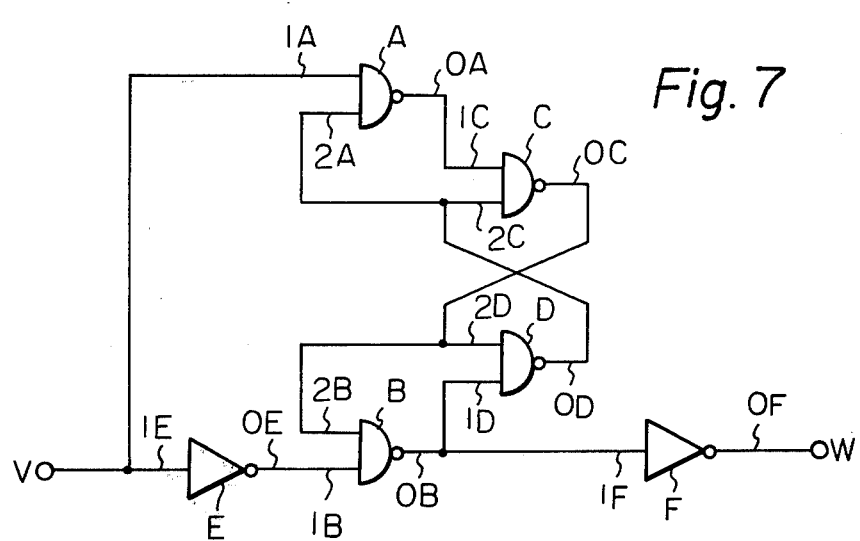
FIG. 7 is a circuit diagram showing a trigger pulse generator circuit included in the arrangement illustrated in FIG. 6.

In FIG. 7, the input terminal V of this trigger pulse generator is coupled to an input port 1A of a NAND gate A, which has an output port OA connected to an input port 1C of a NAND gate C. The input terminal V is also connected to an input port 1E of an inverter amplifier E, which has an output port OE connected to an input port 1B of a NAND gate B. Gate B in turn has an output terminal OB coupled to an input terminal 1D of a NAND gate D as well as to an input terminal 1F of an inverter amplifier F.

The other input port 2C of the NAND gate C is interconnected to both the other input port 2A of the NAND gate A and an output terminal OD of the NAND gate D. The other input terminal 2D is coupled to the other input terminal 2B of the NAND gate B in addition to an output port OC from the NAND gate C. An output port OF of the inverter amplifier F is coupled to an output terminal of this trigger pulse generator.

Figure 8:
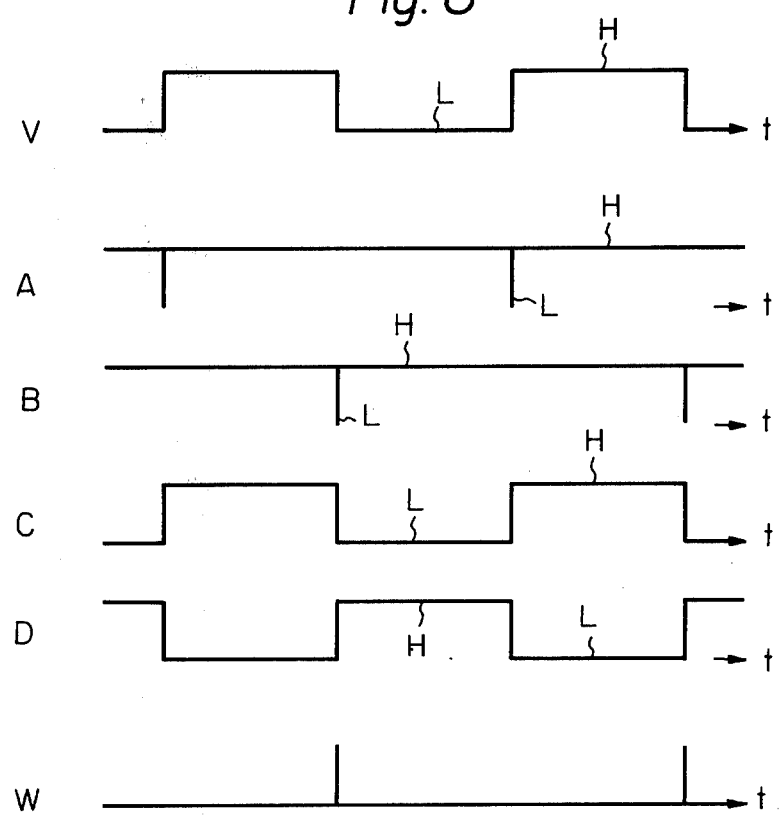
FIG. 8 is the signal waveforms useful in understanding the circuit operation of the trigger pulse generator circuit shown in FIG. 7.

Operation of the circuitry illustrated in FIG. 7 will be explained with reference to the signal waveforms, FIG. 8, appearing at corresponding points of the circuitry.

Thus, in response to a LOW level signal applied to the input terminal V of the trigger pulse generator, the generator uniquely determines the output states of its respective NAND gates in such a manner that the NAND gates A and B produce HIGH level signals, the NAND gate C a LOW, and the NAND gate D a HIGH. Thus, the NAND gate A is disabled by the LOW level signal applied to its input port 1A to develop a HIGH level signal over its output lead OA. If the NAND gate C were in its HIGH state, that is, if the output port OC developed a HIGH level signal, then a LOW level input should be supplied to its input port 2C. In order to provide the input port 2C of the NAND gate C with a LOW level signal, the NAND gate D has to produce a LOW level signal on its output port OD. This means the necessity of the HIGH level input applied to the input terminal 1D of the NAND gate D, which requires that a LOW level input be applied to the input port 1B of the NAND gate B. However, since the LOW level signal is actually applied to the input terminal V of this trigger pulse generator in this instance, the HIGH level signal is supplied to the input port 1B of the NAND gate B. In summary, when the input terminal V is LOW in signal level, the NAND gate C produces a LOW level signal on its output port OC rather than a HIGH level signal.

Now assuming that the input terminal V of the pulse generator is provided with the waveform of which the level abruptly rises from its LOW state to its HIGH state, as shown in FIG. 8V, the NAND gate A is enabled to produce a LOW level signal on its output lead OA since a HIGH level signal has been applied to the input port 2A thereof. Then, the level on the output port OA of the NAND gate A will change from HIGH to LOW and almost simultaneously the NAND gate C is disabled to change its output signal level OC from LOW to HIGH. This permits the signal level on the input terminal 2D of the NAND gate D to change from LOW to HIGH so that the NAND gate D changes its state to develop a LOW level signal, instead of a HIGH level signal, over its output terminal OD. This gives rise to disabling the NAND gate A to change its output from LOW to HIGH again.

The above transient operation is completed instantaneously. Namely, the output signal level on the output port OA of the NAND gate A changes from HIGH to LOW in immediate response to the transfer of the input signal V from LOW to HIGH, stays at its LOW state during a very short period of time, and thereafter returns to its HIGH state immediately, as shown in FIG. 8A. During the time the input signal stays HIGH, the NAND gates B and C are disabled to develop HIGH level signals and the NAND gates D is enabled to produce a LOW level signal on its output lead OD, as clearly shown in FIGS. 8B, 8C and 8D, respectively.

At the instant the signal level on the input lead V changes abruptly from HIGH to LOW, the signal level on the ouput port OB of the NAND gate B falls from HIGH to LOW since the HIGH level signal has been applied to the input port 2B of the NAND gate B, so that the output signal level of the NAND gate D will rise from LOW to HIGH. During this operation, a very short period of the LOW level signal appears from the output terminal OA of the NAND gate A.

During the LOW level signal appearing on the input terminal V, as mentioned above, the output port OA of the NAND gate A is of a HIGH level, the output port OB of the NAND gate B a HIGH, the output port OC of the NAND gate C a LOW and the output port OD of the NAND gate D a HIGH.

Accordingly, each time the signal level appearing on the input terminal V changes from LOW to HIGH, the aforementioned operations are repeated. Thus, in response to the waveforms applied to the input terminal V as shown in FIG. 8V, the signal waveforms developed from the output port OA of the NAND gate A, the output port OB of the NAND gate B, the output port OC of the NAND gate C and the output port OD of the NAND gate D will change as plotted in FIGS. 8A, 8B, 8C and 8D, respectively.

In summary, the trigger pulse generator circuitry shown in FIG. 7 develops a negative trigger pulse from the output port OA of the NAND gate A in response to a positive-going edge of an input pulse appearing on the input terminal V of the generator and a negative trigger pulse from the output port OB of the NAND gate B in response to a negative-going edge of an input pulse applied to the input terminal V of the generator.

The triggering pulse generator circuit shown in FIG. 7 includes an inverter amplifier F which has an input terminal 1F interconnected to the output port OB from the NAND gate B and an output terminal OF interconnected to the output terminal W of the pulse generator. Therefore, inverted waveforms from the output of the NAND gate B will appear on the output lead W, as shown in FIG. 8W.

Returning now to FIG. 6, in operation, the negative trigger pulse generator circuit 30 and the monostable multivibrator 31 function in combination as the rectifier circuit composed of resistor 14, diode 15 and capacitor 16 depicted in FIG. 5. While equal signals in frequency are applied to the input ports 6a and 6b of AND gate 6, the signal waveforms developed from one-shot multivibrator 9 involve no negative-going edges, as can be seen from FIGS. 4e and 4h, so that trigger pulse generator 30 does not produce a trigger pulse. Then, one-shot multivibrator 31 is kept disabled to permit inverter amplifier 32 to keep supplying light emitting diode 34 with power, and the diode 34 is kept illuminated.

On the other hand, when input ports 6a and 6b of AND gate 6 receive signals different in frequency, monostable multivibrator 9 produces the output waveforms changing alternately between its HIGH and LOW levels, as plotted in FIGS. 2e, 2h, 2k, 3e, 3h and 3k. Under these circumstances, trigger pulse generator circuit 30 generates trigger pulses in response to the signal changes applied thereto. If monostable multivibrator 31 has its unstable period of time sufficiently longer than the time intervals between the changes of the trigger signal, monostable multivibrator 31 keeps developing a HIGH level output to disable light emitting diode 34 continuously.

When the rotating body rotates faster than the reference rotational speed, that is, the frequency generated from the amplifier 8 is higher than the reference oscillating frequency supplied from frequency divider 4, the d.c. voltage applied to noninverting input terminal 22b of comparator amplifier 22 will be higher than the d.c. voltage applied to inverting input terminal 22a of the same amplifier to cause comparator amplifier 22 to produce a HIGH level output. This is because, both frequencies are directed to monostable multivibrators 19 and 23, which have the same enable period of time, and integrator circuits 21a and 25a, which have the same integration parameters. Monostable multivibrator 31 is then supplied with triggering pulses from trigger pulse generator circuit 30 subsequently to enable monostable multivibrator 31 to continuously develop a HIGH level signal on its output terminal. Three-input AND gate 26 passes in turn the signal waveforms just applied to input terminal 26a, so that light emitting diode 29 will flash in the time intervals associated with the frequency difference between the signals applied to both input ports of AND gate 6.

To the contrary, if the revolving body revolves slower than the reference revolutional speed, i.e., the frequency produced from tachogenerator 7 is lower than the oscillating reference frequency provided from frequency divider 4, then the d.c. voltage applied to noninverting input port 22b of the comparator amplifier 22 is lower than the d.c. voltage applied to inverting input port 22a thereof to cause comparator amplifier 22 to produce a LOW level output signal. In turn, three-input AND gate 26 receives the LOW level signal on input lead 26b and, on the other hand, three-input AND gate 36 receives the HIGH level signal from inverter amplifier 35 on input lead 36b. This gives rise to flashing light emitting diode 39 in the time intervals associated with the frequency difference between the signals applied to both input terminals of AND gate 6.

Thus, in the revolutional speed indicator system illustrated in FIG. 6, when the rotating body rotates faster than the reference rotation speed, only light emitting diode 29 flashes at a frequency associated with a difference between both speeds, and when the rotation speed of the rotating body is equal to the reference speed, only light emitting diode 34 is lighted permanently. Light emitting diode 39 flashes, in response to the rotating body rotating slower than the reference rotation speed, at a frequency associated with a difference between those two speeds.

If the speed indicator system includes a single reference revolution speed and frequency divider 4 is stable in its output frequency, or if high accuracy is not required in its speed indication, then the system may omit one-shot multivibrator 19 and integrator circuit 21 and a d.c. voltage divided from the power voltage may instead be applied to inverting input terminal 22a of comparator 22.

Figure 9:
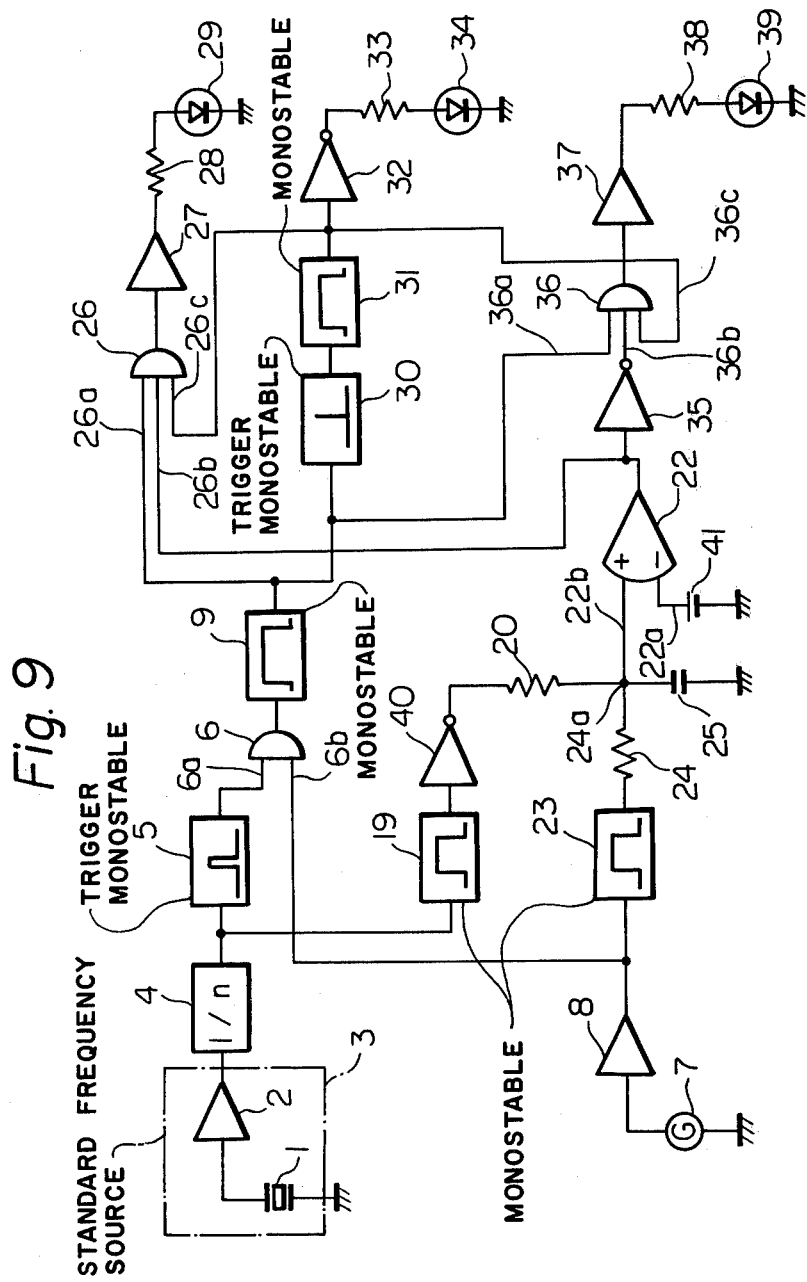
FIG. 9 is a schematic block diagram showing a fourth embodiment of the revolutional speed indicator arrangement in accordance with the present invention.

With reference now to FIG. 9, a third embodiment of the arrangement for indicating revolutional speed of a revolving body similar to the configuration as shown in FIG. 6 except that integration capacitor 21 is eliminated to simplify integrated circuit fabrication. FIG. 9, the monostable multivibrator 19 has its output coupled to an inverter amplifier 40, which has an output interconnected through resistor 20 to noninverting input port 22b of comparator amplifier 22, which has its inverting input port 22a supplied with a reference voltage source 41.

Figure 10:
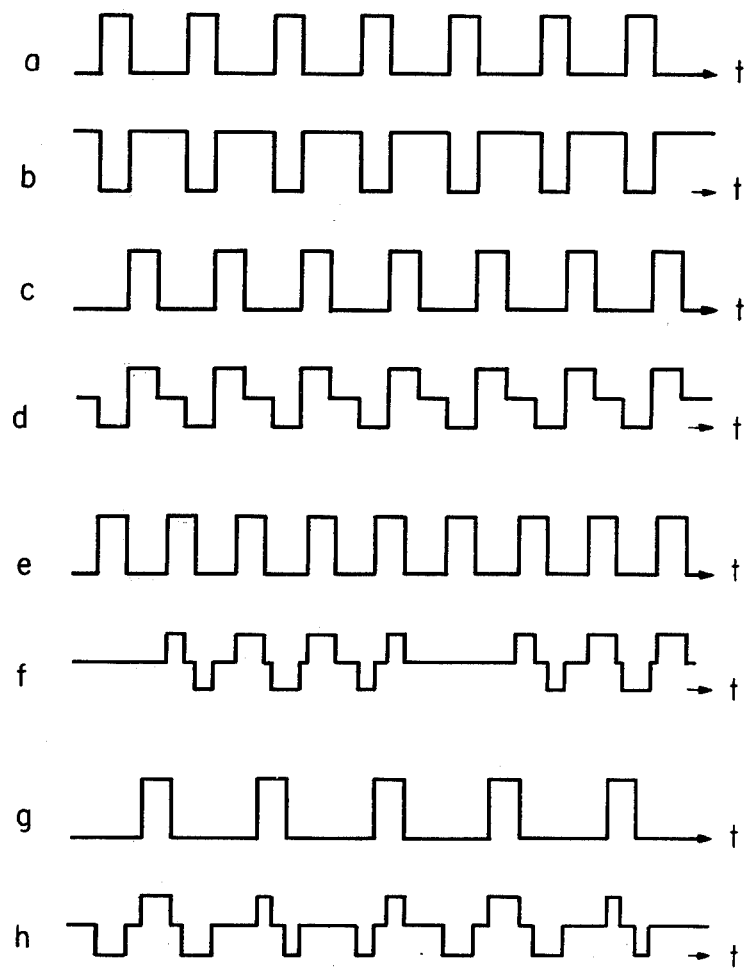
FIG. 10 plots the signal waveforms which are useful in understanding the operation of the indicator arrangement shown in FIG. 9.

Now assuming that monostable multivibrator 19 is developing the square pulses shown in FIG. 10a, in which the pulse durations of the waveforms are determined in dependence upon the time period during which monostable multivibrator 19 stays in its unstable state, inverter 40 produces the inverted forms of the square pulses, as shown in FIG. 10b.

Assuming also that the supplied frequencies from frequency divider 4 and amplifier 8 are equal in frequency but out of phase with each other, monostable multivibrator 23 develops the same waveforms as shown in FIG. 10b. In the FIG. 9 arrangement, both output signals produced from inverter amplifier 40 and from monostable multivibrator 23 are combined by means of resistors 20 and 24, respectively. If integration capacitor 25 were not coupled with the junction 24a common to resistors 20 and 24, the signal waveforms appearing on input port 22b of comparator amplifier 22 would be such as shown in FIG. 10d. Those waveforms are such that the HIGH level durations are equal to the LOW level durations. If such waveforms are smoothed by using capacitor 25, the d.c. level thereof will be half as much as the d.c. voltage which corresponds to the amplitude of those waveforms. Therefore, if voltage source 41 is adjusted so as to be substantially equal to the above d.c. level, it will be possible to determine whether or not frequencies generated from frequency generator 7 are higher than the reference frequency.

When the revolving body (not shown) turns more rapidly than the reference revolutional speed to cause one-shot multivibrator 23 to develop the waveforms at a higher frequency as shown in FIG. 10e, a combination of the higher frequency with the waveforms shown in FIG. 10b brings about the waveforms plotted in FIG. 10f, in which the LOW level durations are longer than the HIGH level durations, leading to comparator amplifier 22 enabled to develop a HIGH level output.

To the contrary, when the revolving body runs slower than the reference speed to permit one-shot multivibrator 23 to develop the waveforms of the lower pulse repetition rate as shown in FIG. 10g, those waveforms are combined at junction 24a with the pulses, FIG. 10b, provided from inverter amplifier 40 to become the waveforms shown in FIG. 10h, in which the LOW level durations are longer than the HIGH level durations, causing comparator amplifier 22 to produce a LOW level output.

The indicator arrangement shown in FIG. 9 thus operates in the same fashion as the FIG. 6 arrangement. Since one capacitance element is removed in the FIG. 9 system, the system can advantageously be fabricated into integrated circuits.

However, the speed indicator arrangement illustrated in FIG. 9 still includes many capacitance elements which are involved in monostable multivibrators 5, 9, 19, 23 and 31 and determine the time periods during which those multivibrators stay in the unstable states thereof. It is therefore difficult to incorporate those capacitance elements into the integrated circuit chips. Those elements have to be discrete. In addition, if it is required to provide a plurality of reference speeds for a revolving body, it is necessary to adjust the monostable multivibrators in the monostable time periods thereof each time one of the reference speeds is selected. This would require much more complexity in circuit configuration and wiring for the indicator arrangement.

Figure 11:
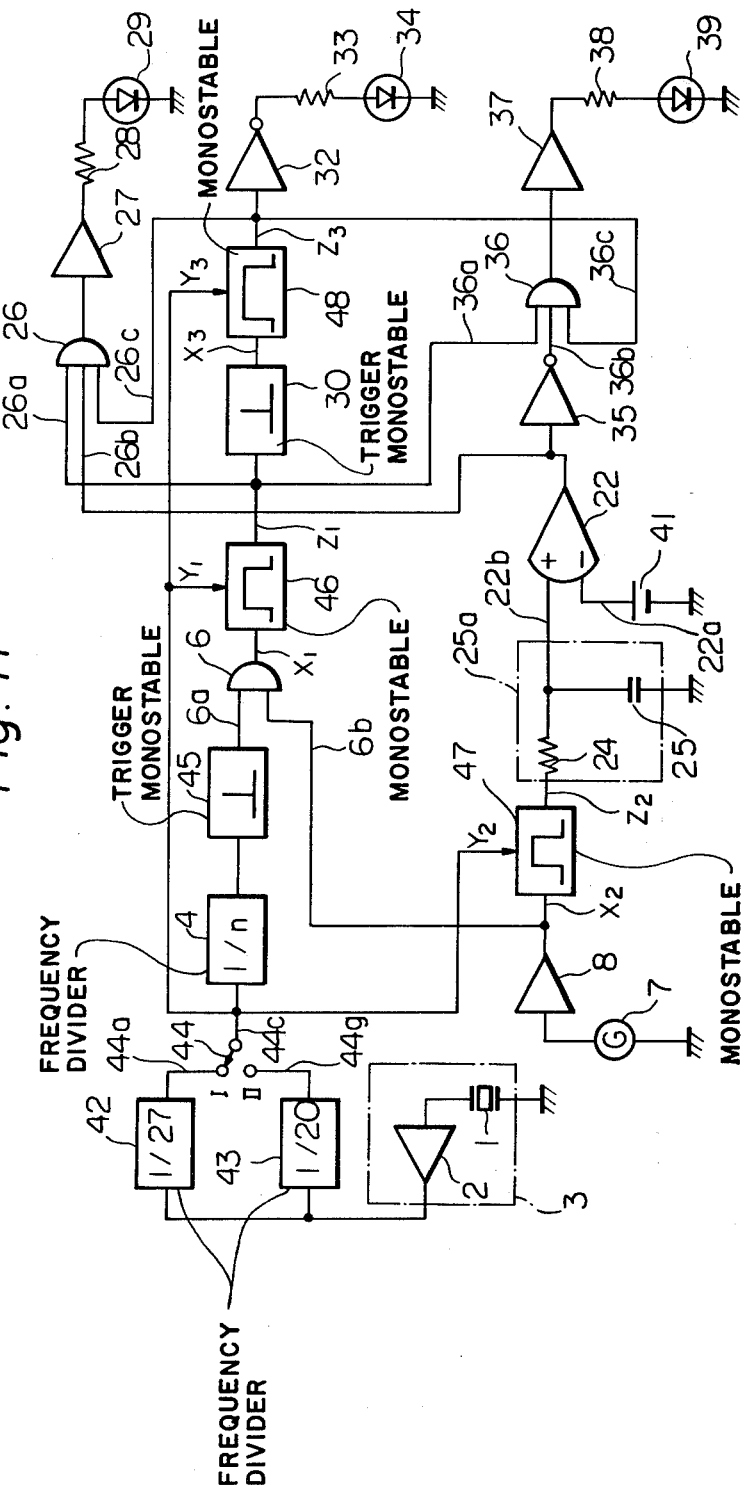
FIG. 11 illustrates in a schematic block d; gram a fifth embodiment of the revolutional speed indicator arrangement in accordance with the present invention.

FIG. 11 illustrates a fourth embodiment of the arrangement for indicating revolutional speed of a revolving body in accordance with the present invention, which embodiment is directed to completely solving the above difficulties. In this arrangement, the output signal from crystal oscillator 3 is applied to both frequency dividers 42 and 43. Frequency divider 42 divides the input frequency thereto by a factor of 27 and frequency divider 43 by a factor of 20. Frequency divider 42 has an output coupled to a terminal I of a contact 44a of a speed selection switch 44, and frequency divider 43 has an output coupled to a terminal II of another contact 44b of speed selection switch 44. The speed selector switch 44 is composed of a transfer switch between contacts 44a and 44b, and a stator, or common, terminal 44c of the switch is coupled to an input port of a frequency divider 4. Frequency divider 4 has an output port connected to a trigger pulse generator circuit 45, which is similar to the aforementioned trigger pulse generator 30. The output of trigger pulse generator 45 has an output port connected to an input port 6a of an AND gate 6, of which an output port is coupled to an input terminal $X_1$ of a monostable circuit 46. The monostable circuit 46 has an output terminal $Z_1$ interconnected to an input port 26a of an AND gate 26, an input port of a trigger pulse generator circuit 30 and an input port 36a of an AND gate 36. The output terminal of amplifier 8 is coupled to an input terminal $X_2$ of a monostable circuit 47, which has an output port $Z_2$ connected to an integrator circuit 25a consisting of a resistor 24 and a capacitor 25. An output from integrator circuit 25a is connected to a noninverting input terminal 22b of a comparator amplifier 22. Trigger pulse generator circuit 30 has an output connected to an input terminal $X_3$ of a monostable circuit 48, which has an output terminal $Z_3$ interconnected to an input port 26c of AND gate 26, an input port of an inverter amplifier 32, and an output port 36c of AND gate 36.

In the arrangement illustrated in FIG. 11, it should be noted that monostable circuits 46, 47 and 48 operate in the same manner as monostable, or one-shot, multivibrators but the time periods during which the monostable circuits stay in the unstable states thereof are controllable in response to signal frequencies applied from the exterior thereof. In the FIG. 11 embodiment, input ports $Y_1$, $Y_2$ and $Y_3$ of the respective monostable circuits are provided with a reference frequency which is selected by and appears on common terminal 44c of speed selector switch 44 to control the monostable time periods thereof.

Figure 12:
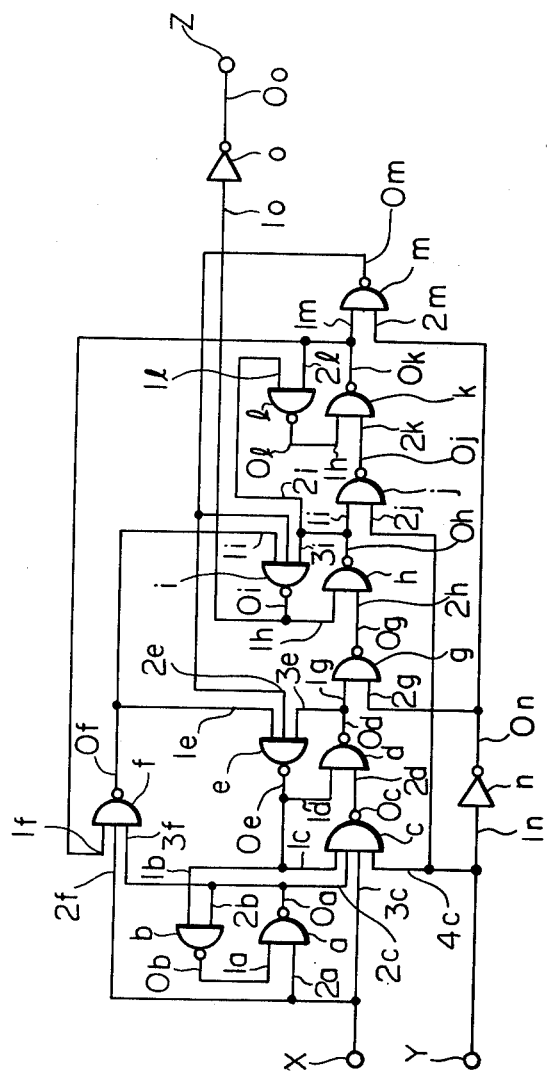
FIG. 12 is a schematic circuit diagram showing a monostable circuit employed in the fifth embodiment shown in FIG. 11.

A fundamental circuit design of those monostable circuits is shown in FIG. 12, and the circuit operation thereof will be detailed with reference to FIGS. 13 and 14, which are plots of the signal waveforms measured at corresponding points in the circuit.

With reference to FIG. 12, a first input terminal of the monostable circuit is coupled to an input port 2a of a two-input NAND gate a, which has an output port Oa coupled to an input port 2b of a two-input NAND gate b and an input port 2c of a four-input NAND gate c. An output port Ob of the NAND gate b is connected to an input port 1a of the two-input NAND gate a together with an input port 2f of a three-input NAND gate f. A second input terminal, or a reference signal input terminal, Y is interconnected to an input port 4c of the four-input NAND gate c, an input port 2j of a two-input NAND gate j and an input port 1n of an inverter amplifier n, which has an output port On interconnected to an input port 2g of a two-input NAND gate g, and an input port 2m of a two-input NAND gate m.

An output port Oc of the four-input NAND gate c is connected to an input port 2d of a two-input NAND gate d, which has an output port Od coupled to an input port 1g of the two-input NAND gate g and an input port 3e of a three-input NAND gate e. NAND gate e has an output port Oe which is interconnected to an input port 1d of the two-input NAND gate d, an input port 1b of the two-input NAND gate b and an input port 1c of the four-input NAND gate c. An output port Og of the two-input NAND gate g is connected to an input port 2h of a two-input NAND gate h, which has an output Oh interconnected to an input port 1j of the two-input NAND gate j, an input port 3i of three-input NAND gate i, and an input port 1l of a two-input NAND gate l. An output port Oi of the three-input NAND gate i is interconnected to an input port 1h of the two-input NAND gate h, and an input port 1O of an inverter O, which has an output port Oo coupled to a signal output terminal Z of the monostable circuit.

An output port Oj of the two-input NAND gate j is coupled to an input port 2k of a two-input NAND gate k, which has an output port Ok interconnected to an input port 1m of a two-input NAND gate m and an input port 2l of the two-input NAND gate l along with an input port 1f of the three-input NAND gate f. An output port 0l of the two-input NAND gate l is coupled with an input port 1k of the two-input NAND gate k. An output port Om of the two-input NAND gate m is interconnected to an input port 2e of the three-input NAND gate e and an input port 2i of the three-input NAND gate i. The three NAND gate f has an output port Of connected to an input port 1e of the three-input NAND gate e together with an input port 1i of the three-input NAND gate i.

The operation of the monostable circuit depicted in FIG. 12 will be detailed as to the case where the waveforms shown in FIGS. 13X and 13Y are applied to the signal input terminals X and Y, respectively. Initially, at the time $t = t_0$ the terminals X and Y receive LOW level inputs. The NAND gates a, c, f and j develop HIGH level outputs. Since the NAND gates e and i have been disabled by the NAND gate m at the time $t = t_0$, they develop HIGH level outputs. The NAND gates b and d produce LOW signals. Although the inverter amplifier n produces a HIGH output, the NAND gate d is enabled to develop a LOW output to cause the NAND gate g to produce a HIGH level output. The NAND gate h in turn produces a LOW output to make the NAND gate l disable to develop a HIGH level output. Then the NAND gate k generates a LOW level output signal. The NAND gate m is disabled to develop a HIGH output and the inverter amplifier O developes a LOW lever output.

As can be seen from FIG. 13X, the signal level on the terminal X changes from LOW to HIGH at the time point $t = t_1$. However, the NAND gates a, c, e, f, g, i, j, l and m which have developed HIGH level outputs receive low signals on other input leads thereof so that those gates do not change their states.

In response to a level transition of the input signal on the terminal Y from LOW to HIGH at the time $t = t_2$, the four-input NAND gate c, which has received HIGH level inputs on the ports 1c, 2c and 3c thereof, develops a LOW level output instead of the previous HIGH output. In response to this transition, the NAND gate d changes its output state from LOW to HIGH to enable the NAND gate e to develop a LOW signal, causing the NAND gate b to change its output from LOW to HIGH and in turn the NAND gate a to change its output from HIGH to LOW. In response to the output transition of the NAND gate a from HIGH to LOW, the NAND gate c is disabled to return its output level from LOW to HIGH. FIGS. 13a, 13b, 13c, 13d and 13e show the output state changes of the NAND gates a, b, c, d and e, respectively.

When the signal level on the terminal Y changes from HIGH to LOW at the time $t = t_3$, the NAND gate g is enabled to develop a LOW signal instead of the previous HIGH output since the NAND gate g has received the HIGH level input on the input lead 1g thereof. This gives rise to the NAND gate h changing the output state thereof from LOW to HIGH and the NAND gate i in turn changing its output from HIGH to LOW. FIGS. 13g, 13h and 13i show the waveforms appearing on the output ports of the NAND gates g, h and i, respectively.

At time point t=t4, the signal level transition from HIGH to LOW on the terminal X causes the NAND gate a to change its output state from LOW to HIGH. However, since the NAND gate e still develops the LOW level output, no change occurs in the output levels of the NAND gates b and c. At the same point in time, the Y input signal level changes from LOW to HIGH, disabling the NAND gate g to develop a HIGH level output. Then, the output signal level of the NAND gate j changes from HIGH to LOW as the NAND gate j has received the HIGH level signal on the input port $1j$ thereof. Therefore, the NAND gate k will change its output state from LOW to HIGH and in turn the output level from the NAND gate l will change from HIGH to LOW. The output signal level changes of the NAND gates j, k and l are plotted in FIGS. 13$j$, 13$k$ and 13$l$.

In response to the signal level transition appearing on the input terminal Y of the monostable circuit from HIGH to LOW at the time t=t5, the output state of the NAND gate m becomes LOW from HIGH to permit the NAND gates e and i to develop HIGH level outputs instead of the LOW levels. The NAND gate j also changes the output state thereof from LOW to HIGH. The LOW to HIGH change of the output level of the NAND gate e permits the NAND gates b and d to be enabled to develop LOW signals instead of HIGH signals. The LOW to HIGH transition of the NAND gate i from LOW to HIGH causes the NAND gate h to be enabled to produce a LOW signal output to change the output state of the NAND gate l from LOW to HIGH together with the output state of the NAND gate k from HIGH to LOW. When the NAND gate k changes its output level from HIGH to LOW, the output of the NAND gate m returns to a LOW level. The NAND gates e and i, however, will not change its output level because the other input ports thereof have already received the LOW inputs. The output waveform from the NAND gate m is depicted in FIG. 13$m$, and the resultant signal waveform produced from the output terminal of the monostable circuit is plotted in FIG. 13$z$.

At time t=t6, the terminal Y receives a positive-going transition. As the NAND gates a, c, e, f, g, i, j, l and m have developed the HIGH outputs and still receive LOW level inputs on the other input ports thereof, those NAND gates do not change the output levels thereof.

Upon an input signal transition on the terminal X from LOW to HIGH, the NAND gate c, which has received HIGH level inputs on other input ports $1c$, $2c$ and $3c$, is enabled to change its output from HIGH to LOW. At that instant, the output level of the NAND gate d changes from LOW to HIGH and the output level of the NAND gate e changes from HIGH to LOW to disable the NAND gate b to develop a HIGH output instead of the LOW output. At the same time, the NAND gate a changes the output state thereof from HIGH to LOW. This change of the NAND gate a output from HIGH to LOW leads to returning the output of the NAND gate c to HIGH from LOW.

At the time t=t8, a negative-going transition of the input waveform on the terminal Y causes the NAND gate g to produce a LOW level output instead of the previous HIGH output since the gate g has already received a HIGH input of the lead $1g$. This will permit the NAND gate h to be activated to produce a HIGH output and the NAND gate i to be deactivated to produce a LOW output.

The positive-going edge at the time point t=t9 of the pulses applied to the terminal Y causes the NAND gate g to be activated to develop a HIGH output. At that time, the NAND gate j changes its output signal level from HIGH to LOW, causing the NAND gate k to change its output level from LOW to HIGH and the NAND gate l to change its output level from HIGH to LOW.

When the input signal level on the terminal X goes from HIGH to LOW at the instant t=t10, the NAND gate a is disabled to develop a HIGH output, and at the same time if the terminal Y receives the negative-going transition of the input pulses then the NAND gate m is deactivated to develop a LOW output signal. This will permit the NAND gates e and i to be disabled to produce HIGH level outputs. The NAND gate j also changes its output signal condition from LOW to HIGH. This positive-going transition of the output from the NAND gate e causes the NAND gates b and d to develop LOW level outputs instead of the HIGHs. In combination with the positive-going transition of the output from the NAND gate i, the NAND gate h changes its output state from HIGH to LOW, permitting the NAND gate l to change the output from LOW to HIGH as well as the NAND gate k to change its output level from HIGH to LOW. Upon the transition of the output of the NAND gate k from HIGH to LOW, the output level of the NAND gate m returns to its HIGH state. The NAND gates e and i, however, will keep developing the HIGH outputs since those gates still receive LOW signals from other input leads thereof.

Figure 13:
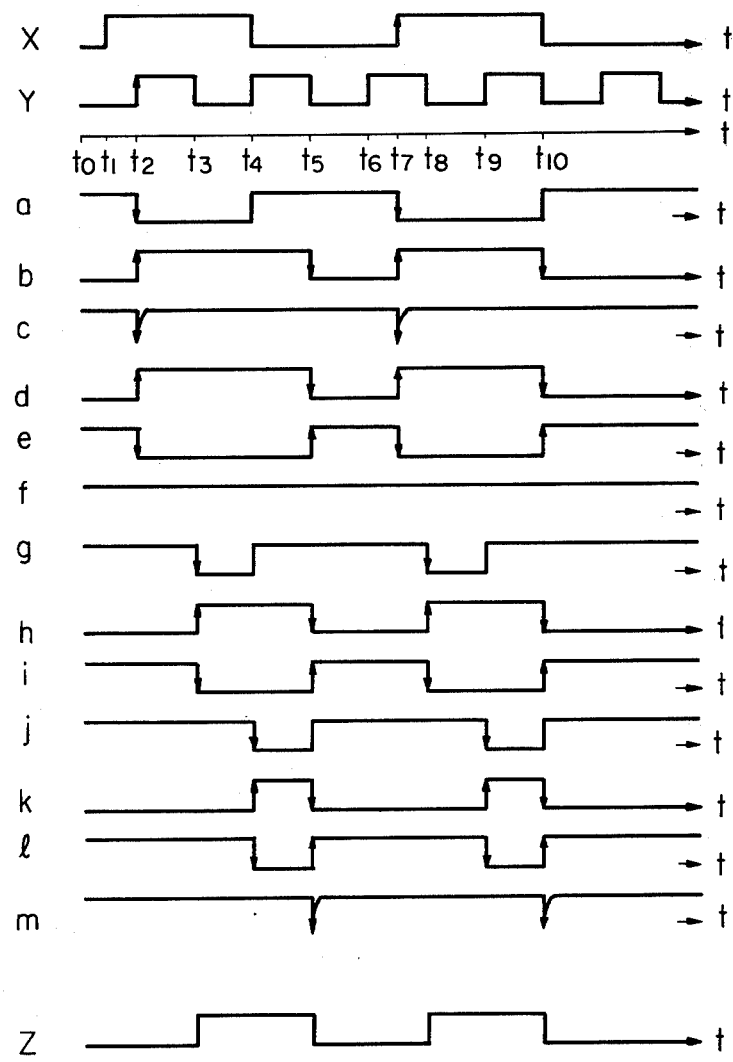
FIGS. 13 and 14 are signal waveform plots useful in understanding the circuit operation of the monostable circuit illustrated in FIG. 12.

As can be seen from FIG. 13$z$, the monostable circuit arrangement illustrated in FIG. 12 has an operative time period, during which the circuit stays in the unstable condition thereof, determined in such a manner that an operative time period is equal in length to a time period of the waveform appearing on the terminal Y during one period of time of the signal waveforms applied on the terminal X.

Figure 14:
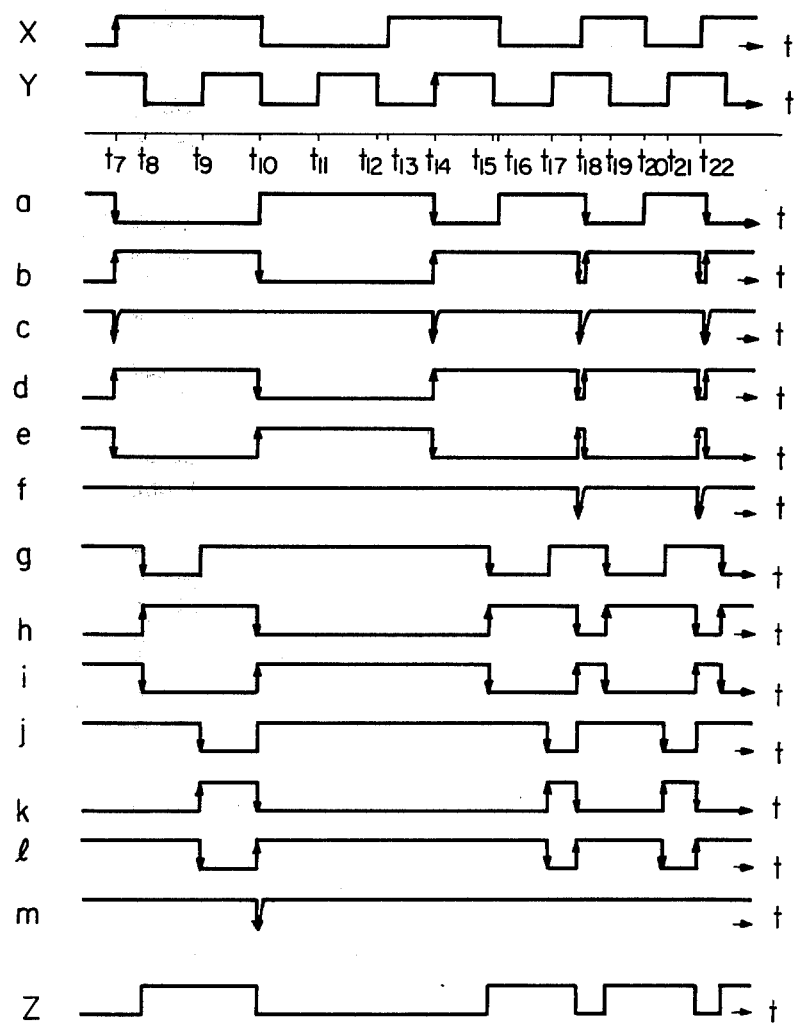

The signal waveform shown in FIG. 13$f$, which simply plots the output signal levels from the NAND gate f, FIG. 12, maintains the HIGH level permanently and fails to reveal how the gate f functions whereas FIG. 14 shows the waveform measured at the points of the FIG. 12 arrangement in order to reveal the function of the NAND gate f. At the time t=t14, both signals appearing on the terminals X and Y rise HIGH, the NAND gate c is enabled to develop a LOW output instead of the HIGH level to cause the NAND gate d to produce a HIGH output and the NAND gate e to produce a LOW output. In turn, the output level from the NAND gate c goes back to its HIGH state and the NAND gate b changes its output level from LOW to HIGH. In turn, the NAND gate a develops a LOW output rather than the previous HIGH output.

At the time t=t15, the terminal Y receives a negative-going transition to permit the output level from the NAND gate g to change from HIGH to LOW so that the NAND gate h will change its output state from LOW to HIGH and in turn the NAND gate i will change its output state from HIGH to LOW.

Upon the negative-going transition of the Y terminal input signal at the instant t=t16, the NAND gate a is disabled to develop a HIGH output. Nevertheless, no change occurs in the output states of the remaining NAND gates.

When the signal level on the terminal Y changes from LOW to HIGH at the time t=t₁₇, the output signal level from the NAND gate g changes from LOW to HIGH and the output signal level from the NAND gate j changes from HIGH to LOW, so that the NAND gate k changes its output level from LOW to HIGH and in turn the NAND gate l changes its output from HIGH to LOW. At this time, HIGH signals are applied to the input ports 1f and 3f of the NAND gate f.

At the time t=t₁₈, the LOW to HIGH transition of the X terminal signal level enables the NAND gate f to develop a LOW output instead of the previous HIGH output to cause the NAND gates e and i in turn to develop HIGH output signals. This permits the NAND gates d, b, h and k to change the outputs thereof from HIGH to LOW and the NAND gate l to change its output from LOW to HIGH. Immediately after that, the NAND gate c is enabled to produce a LOW output and the NAND gate d is disabled to produce a HIGH output, starting the next period of time of the monostable circuit operation. It is to be noted that since the NAND gate k is enabled to develop a LOW output in immediate response to the transition of the output from the NAND gate f from HIGH to LOW the NAND gate f will return to its HIGH level output state. Once the NAND gate d develops the LOW output the NAND gate e is enabled to produce a LOW level output signal to cause the NAND gate b to change its output level from LOW to HIGH, thereby leading to changing the output of the NAND gate a from HIGH to LOW.

In response to the negative-going transition in the output from the NAND gate g at the time point t=t₁₉, the NAND gate h changes the logical output state thereof from LOW to HIGH to in turn cause the NAND gate i to change it output signal level from HIGH to LOW.

At the time t=t₂₀, the input signal on the terminal X goes LOW to cause only the NAND gate a to be disabled to develop a HIGH level output.

At the time point t=t₂₁, the signal appearing on the input terminal Y changes from LOW to HIGH to permit the NAND gate g to be disabled to emit a HIGH level output and the NAND gate j to be enabled to emit a LOW output. In turn, the NAND gate k develops a HIGH output signal to make the NAND gate l enabled to release a LOW output signal.

Upon the positive-going transition of the signal applied to the terminal X, the NAND gate f changes its output state from HIGH to LOW, the monostable circuit performing in turn the similar operation.

In summary, the NAND gate f is provided to develop a reset pulse in response to a positive-going transition of a signal level appearing on the terminal X during the time the NAND gate k develops a HIGH output in order to prevent the transition of the X terminal input from being ineffective. As stated in the foregoing, the monostable circuit shown in FIG. 12 has an enable time period determined so as to be equal to one period of time involved in a reference frequency applied to the terminal Y.

Figure 15:
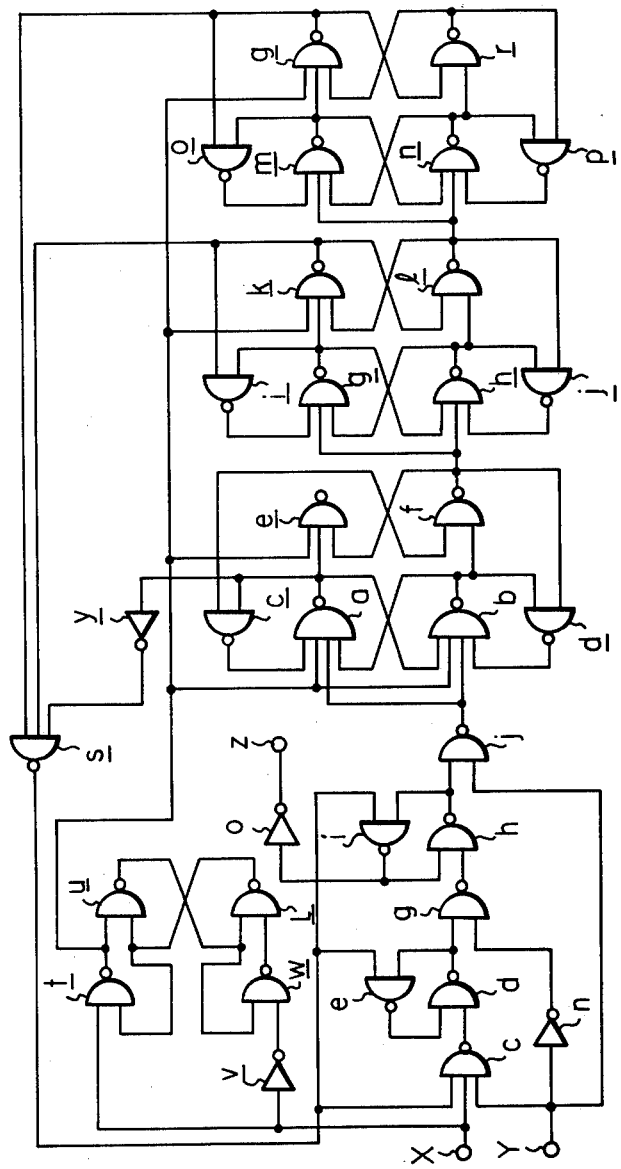
FIG. 15 depicts in a schematic circuit diagram another embodiment of a monostable circuit applicable to the indicator arrangement shown in FIG. 11.
Figure 16:
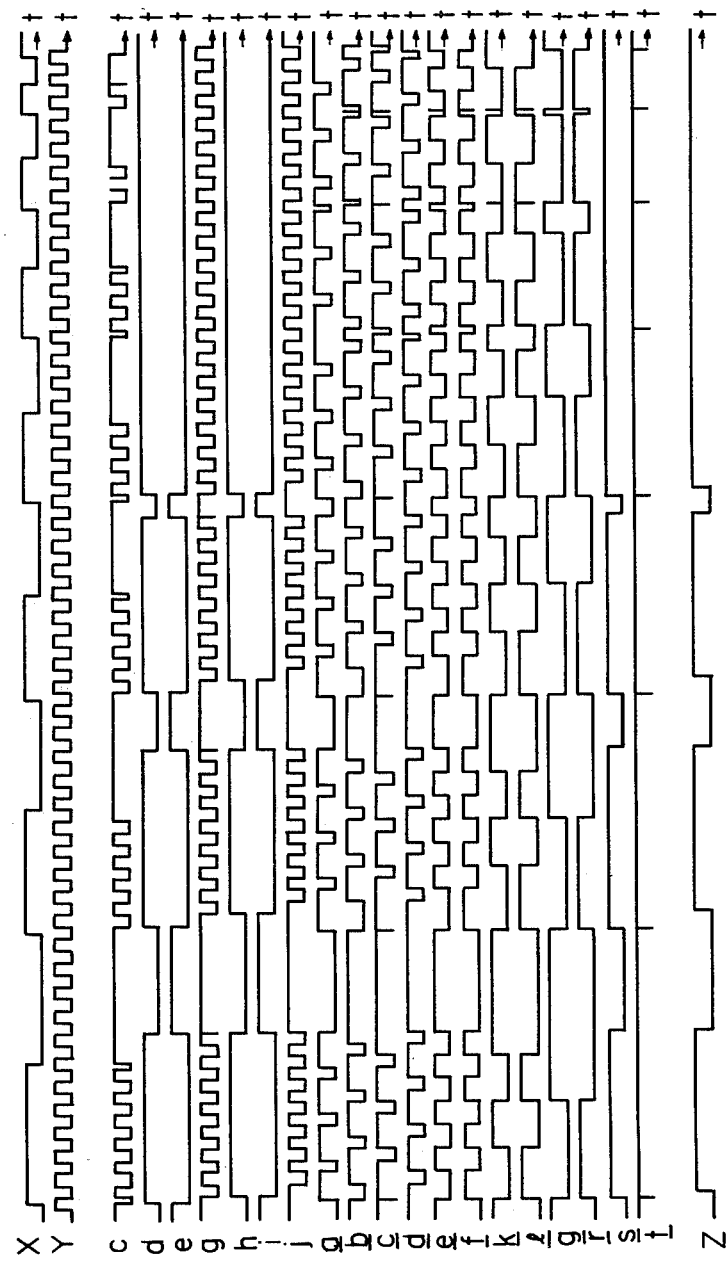
FIG. 16 shows the signal waveforms appearing at the points of the monostable circuit depicted in FIG. 15.

The monostable circuit of the type shown in FIG. 12 may be employed as the monostable circuit 47 included in the indicator system illustrated in FIG. 11. However, for the monostable circuits 46 and 48 shown in FIG. 11, which have advantageously the enable time periods thereof longer than one time period involved in the respective input frequencies, the FIG. 12 monostable arrangement is not applicable because interruptions are involved in the HIGH level durations of the output waveforms extracted from the terminal Z. In that circumstance, a monostable circuit of the type which is perfectly retriggerable may advantageously be used. FIG. 15 depicts such a type of monostable circuit, and FIG. 16 plots waveforms appearing over the output leads of the NAND gates included in the FIG. 15 arrangement.

The arrangement for indicating revolutional speed of a revolving body schematically shown in FIG. 11 has the circuit arrangements shown in FIG. 12 or 15 as the monostable circuits 46, 47 and 48 with the terminals Y thereof receiving the reference frequency supplied from the crystal oscillator 3. Therefore, this indicator system includes no reactance components, such as capacitors and accomplishes very high accuracy in the enable time periods of the monostable circuits used therein, in which periods the monostable circuits remain the unstable states thereof.

The revolutional speed indicator arrangement shown in FIG. 11 may be applied to indicating and adjusting revolving speed of turntables for use in record players. For those applications, the crystal oscillator 3 is adapted to provide input lead 44a, side I, of switch 44 with the frequency associated with the revolutional speed of 33-⅓ rpm of turntables and the input lead 44b, side II, of switch 44 with the frequency associated with the revolutional speed of 45 rpm, so that one of both frequencies will appear on lead 44c of switch 44 as a reference frequency. The operative periods of time of monostable circuits 46, 47 and 48 are selectable and determined by means of switch 44, removing the disadvantage that one would have to set manually the operative time periods of those monostable circuits each time selecting the turntable revolving speeds.

It should be noted that trigger pulse generator circuit 45 shown in FIG. 11 is of the same structure as trigger pulse generator 30 and functions as the monostable multivibrator 5 included in the arrangement illustrated in FIG. 9.

In the revolutional speed indicator arrangements shown in FIG. 1, 5, 6, 9 and 11, the indicator or display elements flash at frequencies equal to frequency differences between the reference frequencies derived from the crystal oscillators and revolutional speed frequencies obtained from the revolutional speed sensors, such as tachogenerators mechanically coupled to rotating bodies. The illustrative embodiments employ logic circuitry including AND gates and monostable devices arranged to develop the frequency difference signals. It is to be noted that the one skilled in the art may employ NAND gates instead of the AND gates and may use other types of switching devices in combination to accomplish the same functions as the AND and NAND gates.

In the illustrative embodiments in accordance with the present invention, the light emitting diodes flash at frequencies equal to differences between the reference frequencies developed from frequency dividers 4 and the revolving speed frequencies generated from frequency generators 7. However, if the flashing periods of the light emitting diodes are not appropriate, i.e., too long or short, then the input or output frequencies of the AND gate 6 may be frequency divided or multiplied.

By using the arrangement for indicating revolutional speed of a revolving body in accordance with the present invention, it can be easily determined whether or not revolutional speed of a revolving body differs from a reference frequency. Use of the indicator arrangement does not affect appearance of turntables of record players as with indicators of the type using stroboscopic patterns. In addition, flashing inhibiting facilities and rotational speed identifier facilities may be incorporated into the indicator arrangement in accordance with the present invention to facilitate determination of rotational speed of rotating bodies.

While the present invention has been described in terms of specific illustrative embodiments, it is to be susceptible of modification by those skilled in the art within the spirit and scope of the appended claims.

What is claimed is:

1. A speed tuning aid for a motor comprising:
   a standard frequency signal source having a selectable frequency;
   a variable frequency signal source for driving said motor;
   a first monostable multivibrator for generating a first monostable pulse in response to each oscillation of a variable frequency signal generated by said variable frequency signal source, said first monostable multivibrator being connected to said standard frequency source to vary the duration of said monostable pulse as a function of the period of said standard frequency signal;
   a smoothing circuit connected to the output of said first monostable multivibrator for generating a voltage signal having a voltage level proportional to the duration and frequency of said first monostable pulses;
   comparator means for generating a first or a second output signal when said voltage signal is higher or lower than a reference voltage, respectively;
   a mixing circuit connected to said standard and variable frequency sources for generating a beat frequency signal;
   a second monostable multivibrator for generating a second monostable pulse in response to each oscillation of said beat frequency signal, said second monostable multivibrator being connected to said standard frequency source to vary the duration of said second monostable pulse as a function of the period of said standard frequency signal;
   a first logic circuit for generating a first speed indicating signal in response to said second monostable pulse in the presence of said first output signal of said comparator means; and
   a second logic circuit for generating a second speed indicating signal in response to said second monostable pulse in the presence of said second output signal of said comparator means.

2. A speed tuning aid as claimed in claim 1, wherein said first monostable multivibrator comprises:
   first bistable means for assuming a first binary state in response to the simultaneous presence of oscillations of said standard and variable frequency signals;
   second bistable means for assuming a first binary state, in the presence of the first binary state of said first bistable means, in response to the absence of the oscillation of said standard frequency signal; and
   first counter means for developing a reset signal for resetting said first and second bistable means to a second binary state in response to a count of oscillations of said standard frequency signal generated in the presence of said first binary state of said second bistable means, said first binary state of said second bistable means corresponding to said first monostable pulse;
   wherein said second monostable multivibrator comprises:
   third bistable means for assuming a first binary state in response to the simultaneous presence of the output of said mixing circuit and an oscillation of said standard frequency signal;
   fourth bistable means for assuming a first binary state, in the presence of the first binary state of said third bistable means, in response to the absence of the oscillation of said standard frequency signal; and
   second counter means for developing a reset signal for resetting said third and fourth bistable means to a second binary state in response to a count of oscillations of said standard frequency signal generated in the presence of said first binary state of said forth bistable means, said first binary state of said fourth bistable means corresponding to said second monostable pulse.

3. A speed tuning aid as claimed in claim 2, wherein said mixing circuit comprises a frequency divider connected to said standard frequency source, a trigger monostable multivibrator connected to the output of said frequency divider and a coincidence circuit connected to be responsive to the outputs of said trigger monostable multivibrator and said variable frequency source.

4. A speed tuning aid as claimed in claim 1, further comprising a trigger monostable multivibrator connected to the output of said second monostable multivibrator to generate a trigger pulse in response to an edge of said second pulse of said second monostable multivibrator, and a third monostable multivibrator for generating a third monostable pulse in response to said trigger pulse, said third monostable multivibrator being connected to said standard frequency source to vary the duration of said third monostable pulse as a function of the period of said standard frequency signal, an inverter for inverting the polarity of said third monostable pulse, and means for visually indicating the output of said inverter.

5. A speed tuning aid as claimed in claim 2, further comprising a trigger monostable multivibrator connected to the output of said second monostable multivibrator to generate a trigger pulse in response to an edge of said second monostable pulse of said second monostable multivibrator, and a third monostable multivibrator comprising: fifth bistable means for assuming a first binary state in response to the simultaneous presence of oscillations of said standard and variable frequency signals; sixth bistable means for assuming a first binary state, in the presence of the first binary state of said sixth bistable means, in response to the absence of the oscillation of said standard frequency signal; third counter means for developing a reset signal for resetting said fifth and sixth bistable means to a second binary state in response to a count of oscillations of said standard frequency signal generated in the presence of said first binary state of said sixth bistable means; and third means for resetting said third counter means in response to the occurrence of said trigger signal from said trigger monostable multivibrator, an inverter connected to the output of said sixth bistable means, and a visual indicator connected to the output of said inverter.

* * * * *